July 15, 1952  A. L. BENNETT ET AL  2,602,963
METHOD OF CEMENTING CARBON BLOCK
TO PORCELAIN BLOCKS
Filed April 8, 1948
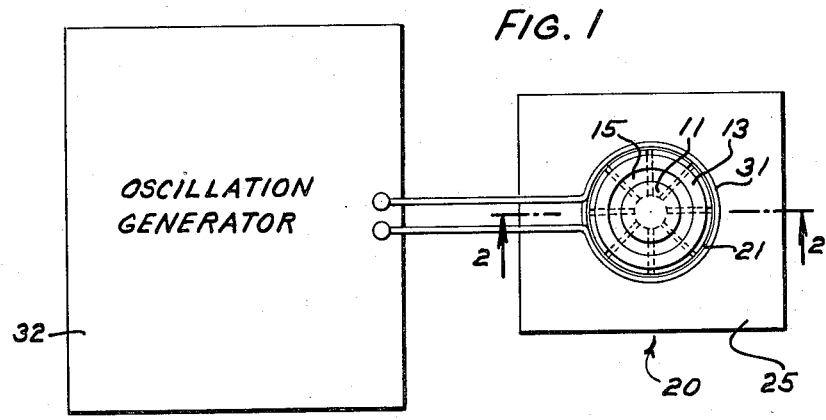
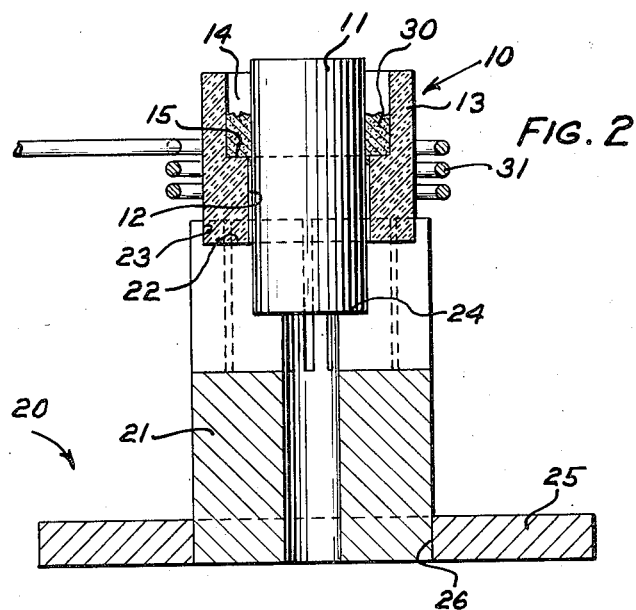
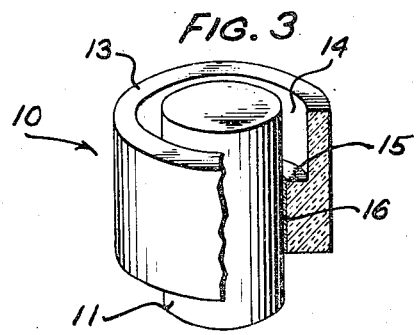
INVENTORS
A. L. BENNETT
G. A. MITCHELL
BY  E. F. Kane
ATTORNEY Patented July 15, 1952

2,602,963

UNITED STATES PATENT OFFICE 2,602,963

METHOD OF CEMENTING CARBON BLOCK TO PORCELAIN BLOCKS

Arthur L. Bennett, Oak Park, and Gerald A. Mitchell, Maywood, Ill., assignors to Western Electric Company, Incorporated, New York, N. Y., a corporation of New York Application April 8, 1948, Serial No. 19,728

3 Claims. (Cl. 18—59)

This invention relates to a method of cementing two parts together and more particularly to a method of assembling carbon bodies to porcelain bodies.

Certain telephone circuits are protected from excess current surges and burn outs by devices known as protector blocks. These blocks comprise carbon elements fastened in and partially surrounded by porcelain jackets. One type of such assembly is rectangular in shape and another type is cylindrical.

In manufacturing the rectangular type the usual method of fastening the carbon element to the porcelain holder is to sprinkle glass powder along the adjacent surfaces of both bodies and then melt the glass powder by placing the entire assembly within an electric or gas furnace. This, of course, subjects not only the glass powder but also the carbon element and the porcelain holder to the radiant heat of the furnace, resulting in several disadvantages. A relatively large amount of electrical energy is consumed in the furnace. The assembly is heated to about 2,000° F. resulting in frequent breakage of the porcelain holders. In addition the appearance of the product is marked by an excess glass coating on the porcelain. This method was particularly disadvantageous when attempts were made to form a round protector block by cementing a round carbon block within an aperture formed in a round tubular porcelain jacket. This was especially true with colored porcelain jackets which did not reflect the heat as well as the white jackets. The porcelain, being on the outside, became heated first and the fused glass, instead of flowing between the carbon element and the porcelain holder where it was needed most, ran toward the areas of greatest heat. These areas were the outer peripheral edges and surfaces of the porcelain jacket which, because of the radiant heat surrounding the assembly, were heated first.

An object of this invention is to provide a new and efficient method of bonding together a carbon body and a porcelain body.

In accordance with one embodiment of this invention, lead borate powder is sprinkled along the abutting surfaces between the carbon block and the porcelain holder of an assembly comprising a compressed carbon block inserted in an aperture formed in a porcelain body, after which the carbon block is heated by high frequency electrical currents induced in the carbon block. Sufficient heat from the carbon block is transferred to the lead borate to fuse it and the fused material flows between the carbon and porcelain bodies, after which the assembly is permitted to cool, the glass forming a bond between the carbon block and porcelain holder.

A complete understanding of this invention may be had by referring to the following detailed description taken in conjunction with the drawing in which Fig. 1 is a plan view showing a protector block and the apparatus used in practicing the invention, the induction coil and the oscillation generator being shown diagrammatically;

Fig. 2 is a sectional view of the apparatus and article shown in Fig. 1 and taken on the line 2—2 of that figure; and Fig. 3 is a partly sectional perspective view of a completely formed protector block.

One type of telephone protector block 10 (Fig. 3) comprises a round rod-like compressed carbon element 11 disposed within an aperture 12 formed in a cylindrical porcelain jacket 13. A concentric ring-shaped depression 14 is formed at the upper end of the porcelain jacket 13 by an inside shoulder 15. The carbon element 11 is cemented to the porcelain jacket 13 with solidified previously melted glass 16.

In practicing the preferred embodiment of this invention the telephone protector block 10 may be assembled by placing a hollow cylindrical porcelain jacket 13 in a recessed circular fixture 20 (Figs. 1 and 2) which may be made from a slotted brass hollow cylinder 21 with thick walls to maintain the lower part of the assembly relatively cool during the heating cycle so as to solidify the glass before it runs out at the bottom of the assembly. An annular shoulder 22 at the upper end of the cylinder 21 cooperates with an inside wall surface 23 to hold the porcelain jacket 13 in a predetermined position. A short rod 11, made of compressed carbon granules in a binder, is then placed within the hollow space of the porcelain jacket and is held in predetermined alignment by a second annular shoulder 24 formed inside the fixture 20. The lower part of the cylinder 21 may be secured to a base plate 25 by any suitable manner, for example, by press-fitting it in an aperture 26 formed in the base.

After the carbon element 11 is placed within the jacket 13, a suitable quantity of granulated fusible cementing material 30, for example, lead borate powder, may be placed within the depression 14 so that the powder 30 will be disposed on the shoulder 15 and around and in contact with the carbon element 11.

The carbon element 11 is then heated with induced high frequency current by disposing the fixture-supporting assembly within the effective field of an induction heating coil 31, connected to the output of a suitable electrical oscillation generator 32. Sufficient high frequency energy is then transferred by induction from the oscillation coil to substantially the mid-section of the carbon element to induce electrical currents within the carbon element that will heat the carbon element to such a degree that the lead borate powder will be fused by heat conducted from the carbon element to the powder. It has been found that the melted glass is "sucked" between the carbon element and the adjacent inner surfaces of the hollow porcelain jacket. This was probably due to surface tension and affinity of the melted glass with the most heated areas. Selectively concentrating the magnetic field and consequently the heat at the midsection of the carbon element stops the fused cement from creeping over the top of the carbon element. Due to the fact that the lower portion of the carbon porcelain assembly is kept relatively cool by the mass of the brass fixture 20, the melted glass solidifies at the lower part of the assembly and will not run out at the bottom. The slots in the fixture 20 prevent excessive heating of the fixture due to induced currents. The carbon-porcelain protector block assembly is then permitted to cool, thus allowing the melted glass to solidify, thereby to form a bond between the carbon and the porcelain.

The size and the number of turns of the coil are governed by the frequency of the oscillation generator with due consideration being given to the dimensions of the assembly to be placed within its effective field. In practicing the invention it was found advantageous to make the coil compact to tighten the coupling and to concentrate the field around the midsection of the carbon element so that the ends of the carbon element would not get unduly heated.

The coil may be cooled by blowing cool air through the turns thereof. Induction heating of carbon is more difficult than the heating of commonly used metals, such as steel or brass because it is non-magnetic and has a specific resistance about 3,500 times that of copper or 500 times the resistance of brass. The binder of the compressed carbon element also acts as an insulator of the carbon particles, increasing the difficulty of induction heating. To overcome these difficulties and economically induce heating currents in the carbon element, it has been found that relatively high frequencies are required for the oscillation generator. For example, it was found that if the oscillation generator had a frequency of 500 kilocycles, 15 kilowatts of generated power output were required to induce about 40 watts into the carbon element in order to heat the carbon element to the temperature required to melt the lead borate powder within a reasonable time, but if the frequency of the oscillation generator was increased to 15 megacycles, the coupling of the energy from the oscillation coil to the carbon element increased to a point necessitating only from 50 to 60 watts of generated power output to induce 40 watts into the carbon element.

Although the example of cementing material given herein is lead borate powder, any suitable cementing material may be used, and its form may be other than granular; for example, it may be in pellet form. Such a material should have a melting point within a temperature range that will not vaporize or otherwise damage the carbon element or the porcelain, and it should, upon solidifying, adhere to the porcelain jacket and to the carbon element. This method is not confined to the use of porcelain but may be practiced wherever a carbon body is to be secured to any heat resistant insulating body with a fusible cementing material.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A method of cementing carbon rods to porcelain bodies, which comprises supporting a porcelain block having a bore therethrough, one end of which bore is enlarged and directed upwardly, positioning a carbon rod of slightly less diameter than the bore of said porcelain block in said bore, placing a predetermined quantity of fusible powdered cement around the rod in the enlarged end of the bore, inductively heating only a predetermined intermediate portion of the rod disposed above the bottom portion of the porcelain block and extending up to the enlarged portion of the bore thereof to cause the heating of portions of the porcelain block adjacent said heated portion of the carbon block and to cause the fusing of the powdered cement and the flow of the cement along only the predetermined heated portion of the carbon rod and the heated surfaces of the porcelain block, and cooling the parts to solidify the cement.

2. A method of cementing carbon rods to porcelain blocks, which comprises holding a porcelain block having a bore and a counterbore in a position in which the axis of the bore and the counterbore is substantially vertical and the counterbore is directed upwardly, positioning a carbon rod of slightly less diameter than the bore of said porcelain block in said bore and said counterbore in spaced relation to the walls thereof and with the carbon rod extending beyond the ends of the ceramic block, placing a predetermined quantity of fusible powdered cement in the counterbore in contact with the rod, inductively heating only a predetermined restricted intermediate portion of the rod in spaced relation to the ends of the porcelain block to cause the heating of surfaces on the porcelain block adjacent the heated portion of the carbon rod and to cause the fusing and the flowing of the cement only along the heated predetermined intermediate portions of the rod and the porcelain block, chilling the lower unheated portions of the rod and the block during the heating of said predetermined intermediate portion of the rod, and cooling the assemblage to cause the setting of the cement and the bonding of the rod to the block.

3. A method of assembling a protector block comprising a cylindrical carbon element and a tubular porcelain element wherein the carbon element is composed of carbon granules bonded together by an insulating binder and the bore of the porcelain element is slightly larger than the diameter of said carbon element and is enlarged at one end to form a recess in the end of the porcelain element, said method comprising supporting said carbon element and said porcelain element in telescoping relation to each other along a substantially vertical axis and with the recessed end of the porcelain element uppermost to provide a small annular space between portions of said elements and with the lower portions of the elements in engagement with a body of relatively high heat conductivity and with the upper ends of the elements at substantially the same level, placing a predetermined quantity of granular fusible cementing material in the recessed end of the porcelain element in engagement with the carbon element, inducing alternating currents of a frequency of approximately 15 megacycles in a predetermined intermediate portion of the carbon element positioned intermediate and in spaced relation to the ends of said porcelain element to heat said intermediate portion of the carbon element and to cause the heating of portions of said porcelain element adjacent said heated portion of the carbon element and to cause the fusing and flowing of the cementing material along the heated surfaces of said predetermined portion of said carbon element and the adjacent heated surface of said ceramic element, and cooling the assemblage to harden the cementing material.

ARTHUR L. BENNETT.
GERALD A. MITCHELL.

REFERENCES CITED

The following references are of record in the file of this patent:

UNITED STATES PATENTS

| Number | Name | Date |
|---|---|---|
| 1,573,315 | Griffin | Feb. 16, 1926 |
| 1,813,425 | Rosaire | July 7, 1931 |
| 1,909,797 | Anderson | May 16, 1933 |
| 2,316,506 | Doelker et al. | Apr. 13, 1943 |
| 2,432,491 | Thomas | Dec. 9, 1947 |